(12) United States Patent
Dire et al.

(10) Patent No.: US 11,059,914 B2
(45) Date of Patent: Jul. 13, 2021

(54) METHOD FOR THE CONTINUOUS SYNTHESIS OF A DIENE ELASTOMER WITH LITHIUM AMIDE INITIATOR

(71) Applicant: COMPAGNIE GENERALE DES ETABLISSEMENTS MICHELIN, Clermont-Ferrand (FR)

(72) Inventors: Charlotte Dire, Clermont-Ferrand (FR); Marie-Hélène Dessendier, Clermont-Ferrand (FR)

(73) Assignee: COMPAGNIE GENERALE DES ETABLISSMENTS MICHELIN, Clermont-Ferrand (FR)

( * ) Notice: Subject to any disclaimer, the term of this patent is extended or adjusted under 35 U.S.C. 154(b) by 190 days.

(21) Appl. No.: 16/472,175

(22) PCT Filed: Dec. 20, 2017

(86) PCT No.: PCT/EP2017/083894
§ 371 (c)(1),
(2) Date: Jun. 20, 2019

(87) PCT Pub. No.: WO2018/115165
PCT Pub. Date: Jun. 28, 2018

(65) Prior Publication Data
US 2019/0352432 A1    Nov. 21, 2019

(30) Foreign Application Priority Data
Dec. 21, 2016   (FR) ...................................... 1663002

(51) Int. Cl.
| | |
|---|---|
| C08F 2/06 | (2006.01) |
| C08F 4/48 | (2006.01) |
| B01J 19/00 | (2006.01) |
| B01J 19/18 | (2006.01) |
| C08F 236/10 | (2006.01) |
| C08F 2/01 | (2006.01) |
| C08F 2/42 | (2006.01) |

(52) U.S. Cl.
CPC ............. *C08F 2/06* (2013.01); *B01J 19/0066* (2013.01); *C08F 2/01* (2013.01); *C08F 2/42* (2013.01); *C08F 236/10* (2013.01); *B01J 2219/0004* (2013.01); *B01J 2219/00033* (2013.01); *B01J 2219/00166* (2013.01)

(58) Field of Classification Search
USPC ..................................... 526/65, 180; 525/53
See application file for complete search history.

(56) References Cited

U.S. PATENT DOCUMENTS

| | | | |
|---|---|---|---|
| 6,313,216 B1* | 11/2001 | Christian ................ | C08C 19/44 524/575 |
| 2002/0120082 A1* | 8/2002 | Hsu .......................... | C08F 4/48 526/180 |
| 2007/0219316 A1 | 9/2007 | Viola | |
| 2013/0090440 A1 | 4/2013 | Valenti et al. | |
| 2015/0086735 A1 | 3/2015 | Valenti et al. | |
| 2016/0060368 A1 | 3/2016 | Döring et al. | |
| 2016/0176991 A1 | 6/2016 | Dire et al. | |
| 2019/0233547 A1* | 8/2019 | Mun ..................... | B60C 1/0016 |

FOREIGN PATENT DOCUMENTS

| | | |
|---|---|---|
| EP | 1829906 A1 | 9/2007 |
| JP | 2009263587 A | 11/2009 |
| WO | 2011157742 A1 | 12/2011 |
| WO | 2013139378 A1 | 9/2013 |
| WO | 2014040640 A1 | 3/2014 |
| WO | 2015018599 A1 | 2/2015 |

OTHER PUBLICATIONS

International Search Report Relating to PCT/EP2017/083894 dated Feb. 26, 2018.
Written Opinion Relating to PCT/EP20107/083894.
Database WPI Week 200980 Thomson Scientific, London, GB; AN 2009-Q99504 XP002772828, & JP 2009 263587 A (Bridgestone Corp) Nov. 12, 2009 (Nov. 12, 2009) abstract.

* cited by examiner

*Primary Examiner* — Fred M Teskin
(74) *Attorney, Agent, or Firm* — Dickinson Wright PLLC

(57) ABSTRACT

A process for the continuous synthesis of a diene elastomer is provided. The synthesis is conducted by means of n reactors r1 to rn, considered to be continuous stirred-tank reactors, which are equipped with an internal stirring system. The reactors are arranged in series, n varying from 2 to 15, preferably from 2 to 9. The reactor r1 is fed by an input solution comprising a solvent, one or more monomer(s), an anionic polymerization initiator chosen from lithium amides and a polar agent. The conversion by weight $C_1$ in the first reactor is less than 70%, and the total conversion by weight $C_n$ at the outlet of the reactor rn is greater than or equal to 70%.

17 Claims, 1 Drawing Sheet

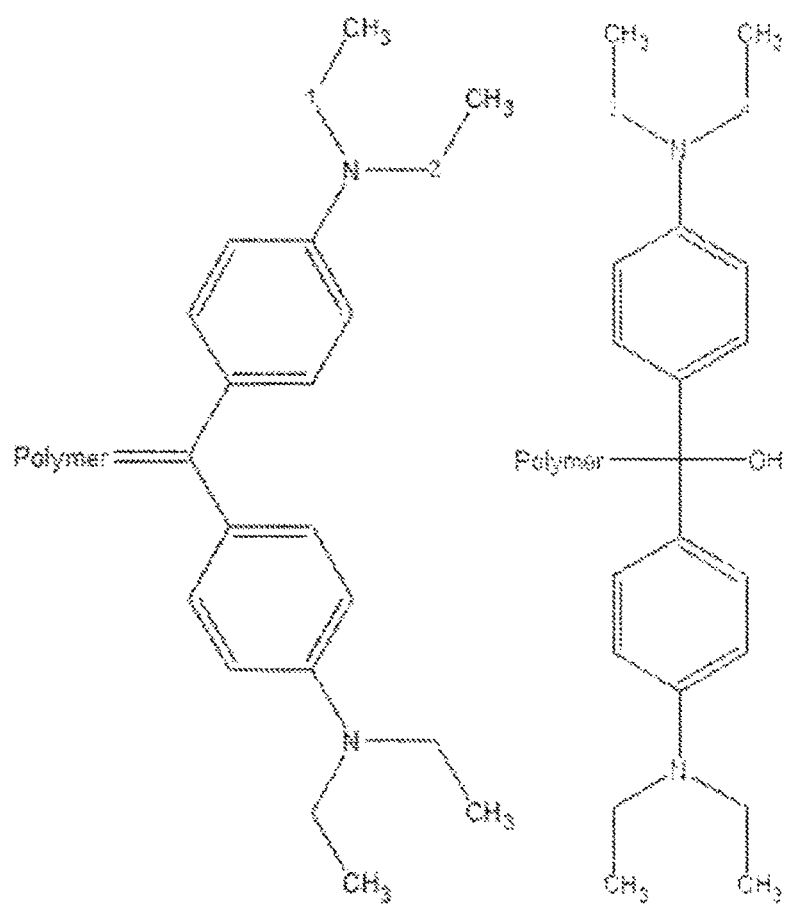

METHOD FOR THE CONTINUOUS SYNTHESIS OF A DIENE ELASTOMER WITH LITHIUM AMIDE INITIATOR

This application is a 371 national phase entry of PCT/EP2017/083894 filed on 20 Dec. 2017, which claims benefit of French Patent Application No. 1663002, filed 21 Dec. 2016, the entire contents of which are incorporated herein by reference for all purposes.

BACKGROUND

1. Technical Field

The present invention relates to a process for the continuous synthesis, by means of several reactors in series, of a diene elastomer, making it possible to obtain a high content of living polymer, in the case of an initiation with a lithium amide.

2. Related Art

Now that savings in fuel and the need to protect the environment have become a priority, it is desirable to produce polymers having good mechanical properties and a hysteresis which is as low as possible in order to be able to employ them in the form of rubber compositions which can be used in the manufacture of various semi-finished products involved in the composition of tyre covers, such as, for example, underlayers, bonding rubbers between rubbers of different natures, coating rubbers for metal or textile reinforcing elements, sidewall rubbers or treads, and to obtain tyres with improved properties, in particular having a reduced rolling resistance.

The reduction in the hysteresis of the mixtures is an ongoing objective of the tyre industry in order to limit fuel consumption and to thus protect the environment.

Many solutions have already been experimented with in order to achieve the objective of a fall in hysteresis. Mention may in particular be made of the modification of the structure of diene polymers and copolymers at the end of polymerization by means of functionalization agents, coupling agents or star-branching agents with the aim of obtaining a good interaction between the polymer, thus modified, and the filler, whether this is carbon black or a reinforcing inorganic filler. Mention may also be made of the use of a functional initiator having a functional group which interacts with the filler.

Mention may be made, by way of illustration of this prior art, of the use of diene elastomers functionalized by alkoxysilane compounds and amine compounds.

Mention may be made of Patent JP4655706B2, in which provision is made to combine the functionalization of the living chain end with a compound of the alkoxysilane type bearing an amine functional group with the initiating with an amine-functional alkyllithium with the aim of minimizing the hysteresis. In the same way, provision is made, in Patent Application US20120245275A1, to combine the functionalization of the living chain end with a compound of the alkoxysilane type bearing an amine functional group with the initiating with a lithium amide but also with a functional monomer of the vinylaminosilane type. Finally, in Patent Applications WO2015063161A1, WO2015044225A1, WO2015018772A1 and WO2015018600A1, provision is made to combine the initiating with a lithium amide with the reaction of the living chain end with compounds of the alkoxysilane type bearing different groups having an affinity for silica.

As illustrated above, the use of functional initiators having a group which interacts with silica, such as amine-functional alkyllithiums or lithium amides, is advantageous in reducing the rolling resistance while decreasing the dissipation of energy related to the free chain ends. It thus appears advantageous to be able to use them on the industrial scale in competitive processes for the synthesis of elastomers.

It is known to a person skilled in the art that continuous synthesis processes are more competitive than batchwise synthesis processes, for which frequent shutdowns and restart-ups are necessary. While the use of initiator of the lithium amide type results in high conversions of monomers (greater than 85%) and high contents (greater than or equal to 90%) of living polymer chains in the $C^-Li^+$ form being jointly obtained in the batchwise process, a high conversion of monomers (greater than 85%) is associated with a low content of living polymer chains (less than 60%) and a high content of living polymer chains (greater than or equal to 90%) is associated with a low conversion of monomers (less than 70%) in the case of a conventional continuous process in a reactor.

SUMMARY

The aim of the invention is thus to identify a continuous synthesis process which makes it possible to jointly obtain a high conversion of monomers (greater than 70% by weight) and a high content of living polymer chains (greater than or equal to 90% by number) on conclusion of the polymerization stage in the case of an initiation with a lithium amide. A high content of living polymer on conclusion of the polymerization stage is desirable in order to be able to functionalize, couple or star-branch, as desired, the polymer chains.

The inventors have now discovered, surprisingly, that the aims of the invention could be obtained by a continuous synthesis process comprising several reactors in series, the conversion by weight in the first reactor being less than 70%, the polymerization being continued in such a way that the total conversion by weight at the outlet of the final reactor is greater than 70%.

BRIEF DESCRIPTION OF THE DRAWINGS

FIG. 1 includes a formula for grafted diethylaminobenzophenone, dehydrated and carbinol forms according to example embodiments.

DETAILED DESCRIPTION OF EXAMPLE EMBODIMENTS

A subject matter of the invention is thus a process for the continuous synthesis of a diene elastomer by means of n reactors r1 to rn, considered to be continuous stirred-tank reactors, which are equipped with an internal stirring system and which are arranged in series, n varying from 2 to 15, preferably from 2 to 9, the reactor r1 being fed by an input solution comprising a solvent, one or more monomer(s), an anionic polymerization initiator chosen from lithium amides and a polar agent, the conversion by weight $C_1$ in the first reactor being less than 70%, one or more of the reactors r2 to rn additionally being optionally fed by reinjection of a solution, preferably a purified solution, comprising solvent and/or monomers and/or polar agent, the conversion by weight $C_1$ in the first reactor being less than 70%, where $C_1 = P_1/W_1$ where $P_1$ is the weight of polymer formed at the outlet of the reactor r1, where $W_1$ is the amount by weight of monomer(s) introduced into the reactor r1, the total conversion by weight $C_n$ at the outlet of the reactor rn being greater than or equal to 70%, where:

$$C_n = \frac{P_n}{\sum_1^n W_i}$$

where $P_n$ is the weight of polymer formed at the outlet of the reactor rn, where $W_i$ is the amount by weight of monomer(s) introduced into the reactor ri, i varying from 1 to n.

In the context of the present patent application, the term "optional reinjection" refers to the repeating of the action of injection into a reactor ri', other than the reactor r1, already fed by the stream from ri'−1. The reinjection can be carried out directly into one or more of the reactors or, advantageously, by mixing with the stream resulting from ri'−1. The reinjection can be carried out with streams having a composition identical to or different from the r1 feed stream. When the reinjection takes place in at least two reactors, the natures of these reinjections can be identical or different. The term "reinjected monomer" refers to the monomer injected into ri' not resulting from the stream originating from ri'−1.

Thus, the term "amount by weight $W_i$ of monomer(s) introduced into the reactor ri" is understood to mean, when i=1, the amount of monomer(s) present in the input solution and introduced as such into the reactor 1 and, when i=2 to n, the amount of monomer(s) optionally reinjected into the reactor i.

The control of the conversion in all the reactors, in particular in the first and the final reactor, is provided by the temperature, the residence time, the amount of polar agent and the amount of monomer entering these reactors, the concentration of living polymer. A person skilled in the art knows how to vary these different parameters in order to control the conversions in the different reactors.

The temperature of each reactor advantageously varies from 20 to 150° C.

The process according to the invention makes it possible to obtain, at the outlet of the final reactor, a content of living chains of greater than or equal to 90% by number, with respect to the total number of living chains initiated in the reactor r1. However, when a solution is reinjected as explained above, this solution is advantageously purified in order not to degrade the living polymer.

In the case of an anionic polymerization, the living chain is a carbanion. The carbanion is a very reactive entity. It reacts with protic entities or electrophilic entities.

Thus, if the feedstock of the first reactor contains protic impurities (alcohols, water, acids, and the like) or electrophilic impurities (carbonyls, and the like), the initiator will react first with these impurities to lead to inactive entities (alkoxides, and the like) incapable of initiating the polymerization of the monomers. The difference between the amount of initiator introduced at the inlet of the reactor r1 and the amount of initiator which has reacted with the impurities in the reactor r1 constitutes the amount of active initiator. The number of living chains initiated in the reactor r1 is equivalent to this amount of active initiator in the reactor r1.

Preferably, the number of reactors is equal to 2 or 3, preferably 2.

Preferably, the conversion by weight $C_1$ in the reactor r1 is less than 65%, preferably less than 60%.

Preferably, the total conversion by weight $C_n$ at the outlet of the reactor rn is greater than or equal to 80%, more preferably greater than or equal to 85%.

Preferably, the residence time in the reactor r1, i varying from 1 to n, is between 1 and 60 minutes, preferably between 5 and 60 minutes, more preferably between 10 and 50 minutes. It is calculated in the following way:

$$\tau_i = \frac{V_i}{Q_{Vi}}$$

with:

$V_i$, volume of the reactor ri, i varying from 1 to n $Q_{Vi}$=flow rate by volume exiting from the reactor i.

As explained above, according to a specific mode, one or more of the reactors r2 to rn is additionally fed by reinjection of a solution, preferably a purified solution, comprising solvent and/or monomers and/or polar agent.

As the polymer carbanion is a very reactive entity, as explained above, the neutralization of the impurities introduced by the reinjection will be carried out by the polymer carbanion. This neutralization prevents the polymer chain from continuing to propagate since the chain becomes inactive towards the polymerization but also towards the functionalization. This entity is thus no longer reactive with the optional stopping, functionalization, coupling or star-branching agents.

This is why, apart from the feedstock of the first reactor, it may be necessary to control the purity of each optionally reinjected solution in order to contribute to the lowest possible dead-polymer content at the outlet of the reactor rn, i.e. less than 10% by number, with respect to the total number of chains initiated in the reactor r1.

The term "purity of a reinjected solution" is understood to mean the proportion by weight of optional monomer(s), and of optional solvent and of optional polar agent, with respect to the total weight of the reinjected solution.

The purification stage consists in removing, from the reinjected solution, the protic compounds (water, alcohol, acids, and the like) and electrophilic compounds (carbonyl, and the like) which can deactivate the living chain end, so as to reduce their amount in this reinjected solution to a content of less than or equal to 5 mol % of the active initiator, preferably of less than or equal to 2 mol % of the active initiator.

The term "active initiator" is understood to mean the amount of starting material of lithium amide type used as initiator and not to neutralize the impurities.

Each reinjected solution contains purified solvent, if necessary, and/or purified monomers, if necessary, and/or purified polar agent, if necessary.

The constituent or each constituent of the reinjected solution(s) can be, before reinjection, purified independently by any purification means normally used to purify the constituents, for example by adsorption, liquid/liquid extraction, gas/liquid extraction or distillation.

Alternatively, the solution to be reinjected, comprising all or part of the combination of its constituents, can, before reinjection, be purified by any purification means normally used to purify the constituents, for example by adsorption, liquid/liquid extraction, gas/liquid extraction or distillation.

The term "diene elastomer" should be understood, in a known way, as meaning an (one or more is understood) elastomer resulting at least in part (i.e., a homopolymer or a copolymer) from diene monomers (monomers bearing two conjugated or non-conjugated carbon-carbon double bonds). More particularly, the term "diene elastomer" is understood to mean any homopolymer obtained by polymerization of a conjugated diene monomer having from 4 to 12 carbon atoms or any copolymer obtained by copolymerization of one or more conjugated dienes with one another or with one or more vinylaromatic monomers having from 8 to 20 carbon atoms. In the case of copolymers, the latter contain from 20% to 99% by weight of diene units and from 1% to 80% by weight of vinylaromatic units.

The following in particular are suitable as conjugated dienes which can be used in the process in accordance with the invention: 1,3-butadiene, 2-methyl-1,3-butadiene, 2,3-di ($C_1$ to $C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1, 3-butadiene, phenyl-1,3-butadiene, 1,3-pentadiene and 2,4-hexadiene, and the like.

The following in particular are suitable as vinylaromatic monomers: styrene, ortho-, meta- or para-methylstyrene, the "vinyltoluene" commercial mixture, para-(tert-butyl)styrene, methoxystyrenes, vinylmesitylene, divinylbenzene and vinylnaphthalene, and the like.

The diene elastomer is preferably selected from the group of highly unsaturated diene elastomers consisting of polybutadienes (BRs), synthetic polyisoprenes (IRs), butadiene copolymers, in particular copolymers of butadiene and of a vinylaromatic monomer, isoprene copolymers and the mixtures of these elastomers. Such copolymers are more particularly butadiene/styrene copolymers (SBRs), isoprene/butadiene copolymers (BIRs), isoprene/styrene copolymers (SIRs) and isoprene/butadiene/styrene copolymers (SBIRs). Among these copolymers, butadiene/styrene copolymers (SBRs) are particularly preferred.

The diene elastomer is prepared by anionic polymerization in the presence of a lithium amide polymerization initiator included in the input solution.

The lithium amides are the products of the reaction of an organolithium compound, preferably an alkyllithium compound, and of a non-cyclic or cyclic, preferably cyclic, secondary amine.

Mention may be made, as secondary amine which can be used to prepare the initiators, of dimethylamine, diethylamine, dipropylamine, di(n-butyl)amine, di(sec-butyl)amine, dipentylamine, dihexylamine, di(n-octyl)amine, di(2-ethylhexyl)amine, dicyclohexylamine, N-methylbenzylamine, diallylamine, morpholine, piperazine, 2,6-dimethylmorpholine, 2,6-dimethylpiperazine, 1-ethylpiperazine, 2-methylpiperazine, 1-benzylpiperazine, piperidine, 3,3-dimethylpiperidine, 2,6-dimethylpiperidine, 1-methyl-4-(methylamino)piperidine, 2,2,6,6-tetramethylpiperidine, pyrrolidine, 2,5-dimethylpyrrolidine, azetidine, hexamethyleneimine, heptamethyleneimine, 5-benzyloxyindole, 3-azaspiro[5.5]undecane, 3-azabicyclo[3.2.2]nonane, carbazole, bistrimethylsilylamine, pyrrolidine and hexamethyleneamine.

The secondary amine, when it is cyclic, is preferably chosen from pyrrolidine and hexamethyleneamine.

The alkyllithium compound is preferably ethyllithium, n-butyllithium (n-BuLi), isobutyllithium, and the like.

The polymerization is carried out in the presence of a solvent included in the input solution.

The solvent used in the process according to the invention is preferably an inert hydrocarbon solvent which can, for example, be an aliphatic or alicyclic hydrocarbon, such as pentane, hexane, heptane, isooctane, cyclohexane or methylcyclohexane, or an aromatic hydrocarbon, such as benzene, toluene or xylene.

As explained above, the input solution, and also optionally one or more of the reinjected solutions, used in the process according to the invention comprise(s) a polar agent.

Suitable in particular as chelating polar agents which can be used in the process in accordance with the invention are the agents comprising at least one tertiary amine functional group or at least one ether functional group and preferably agents of tetrahydrofurfuryl ethyl ether or tetramethylethylenediamine type.

According to a first specific embodiment, the output stream from the reactor n containing the living chains is brought into contact with one or more agents for stopping the polymerization as known per se, injected continuously into the process.

In this first embodiment, the living diene elastomer included in the output stream from the reactor n can, prior to the stopping, be reacted with one or more functionalization, coupling or star-branching agents.

The distinguishing feature of these functionalization, coupling or star-branching agents is that they can either modify the elastomer so as to improve the interaction with a reinforcing filler (this is the case for functionalization, coupling and certain star-branching agents) or confer a given structure on the polymer (this is the case for certain star-branching and coupling agents).

According to a second specific embodiment, the living diene elastomer included in the output stream from the reactor n is reacted with one or more functionalization, coupling or star-branching agents also acting as agents for stopping the polymerization. It is then not necessary to add a conventional stopping agent known per se in order to bring the polymerization to an end.

Whatever the embodiment, any agent known per se can be envisaged as functionalization, coupling or star-branching agent.

The residence time in each tubular reactor, or tubular reactor having axial dispersion, is preferably between 0 and 120 minutes, in particular between 0.1 and 60 minutes, more preferably between 0.1 and 5 minutes.

The abovementioned characteristics of the present invention, and also others, will be better understood on reading the following description of several implementational examples of the invention, given by way of illustration and without limitation.

Measurements and Tests Used

Conversion

The conversions are measured by weighing the solids content of the solution containing the polymer. In this method, solution containing the polymer is withdrawn at the outlet of the reactor. This solution is introduced into a pre-tared tray. The mass of solution is thus weighed.

The sample is dried under a reduced pressure of 200 mmHg at 140° C. for 15 minutes. The tray is subsequently placed in a desiccator containing silica gel for 2 minutes. Weighing the tray then makes it possible to determine the weight of polymer of the withdrawn sample. The conversion at the outlet of the reactor is then worked back to via the concentration of monomers.

$$C = \frac{\frac{W_{solids\ content}}{W_{sample}}}{\frac{\sum_{1}^{n} W_i}{\sum_{1}^{n} Q_i}} \cdot 100$$

with $$\sum_{1}^{n} W_i$$

which represents the sum of all the inputs by weight of monomers in the total process (reactors 1 to n) and $$\Sigma_1^n Q_i$$

which represents the sum of all the inputs by weight in the total process (reactors 1 to n).
(Solvent, Monomers, Catalysts, and the Like), the ratio $$\frac{\sum_{1}^{n} W_i}{\sum_{1}^{n} Q_i}$$

corresponding to the % by weight of monomers.

Glass Transition Temperature

In these examples, the glass transition temperatures (Tg) of the elastomers are determined using a differential scanning calorimeter.

Microstructure of the Elastomers

The microstructure of the elastomers is characterized by the near-infrared (NIR) spectroscopy technique.

Near-infrared spectroscopy (NIR) is used to quantitatively determine the content by weight of styrene in the elastomer and also its microstructure (relative distribution of the 1,2-, trans-1,4- and cis-1,4-butadiene units). The principle of the method is based on the Beer-Lambert law generalized for a multicomponent system. As the method is indirect, it involves a multivariate calibration [Vilmin, F., Dussap, C. and Coste, N., Applied Spectroscopy, 2006, 60, 619-29] carried out using standard elastomers having a composition determined by $^{13}C$ NMR. The styrene content and the microstructure are then calculated from the NIR spectrum of an elastomer film having a thickness of approximately 730 nm. The spectrum is acquired in transmission mode between 4000 and 6200 $cm^{-1}$ with a resolution of 2 $cm^{-1}$ using a Bruker Tensor 37 Fourier-transform near-infrared spectrometer equipped with an InGaAs detector cooled by the Peltier effect.

Number-Average Molar Mass and Polydispersity Index

The number-average molar mass and the polydispersity index of the polymer are determined using SEC (size exclusion chromatography).

The SEC (Size Exclusion Chromatography) technique makes it possible to separate macromolecules in solution according to their size through columns filled with a porous gel. The macromolecules are separated according to their hydrodynamic volume, the bulkiest being eluted first.

SEC makes it possible to comprehend the average molar masses and the distributions of the molar masses of a polymer. The various number-average molar masses ($M_n$) and weight-average molar masses ($M_w$) can be determined from commercial standards and the polydispersity index ($PI=M_w/M_n$) can be calculated via a "Moore" calibration.

There is no specific treatment of the polymer sample before analysis. The latter is simply dissolved in the elution solvent at a concentration of approximately 1 $g \cdot l^{-1}$. The solution is then filtered through a filter with a porosity of 0.45 µm before injection.

The apparatus used is a Waters Alliance chromatographic line. The elution solvent is either tetrahydrofuran or tetrahydrofuran+1 vol % of diisopropylamine+1 vol % of triethylamine, the flow rate is 1 $ml \cdot min^{-1}$, the temperature of the system is 35° C. and the analytical time is 30 min. A set of two Waters columns with the Styragel HT6E trade name is used. The volume of the solution of the polymer sample injected is 100 µl. The detector is a Waters 2410 differential refractometer and the software for making use of the chromatographic data is the Waters Empower system.

The calculated average molar masses are relative to a calibration curve produced for SBRs having the following microstructure: 28% by weight of units of styrene type, 18% by weight of units of 1,2-type, 31% by weight of units of trans-1,4-type and 23% by weight of units of cis-1,4-type.

Content of Living Chains in the Elastomer at the Outlet of the Reactors

In the examples, the living polymer solution at the outlet of the polymerization reactors is brought continuously into contact with the DEAB (diethylaminobenzophenone) functionalization agent in excess with a contact time sufficient for the complete reaction of all the living chains with the functionalization agent. The content of grafted DEAB (content of functional group in the examples) is determined by an NMR analysis. This determination is carried out with respect to the amount of elastomer. In this way, the results obtained can be expressed as molar %, as mmol/kg of elastomer or as phr (per hundred grams of elastomer).

The samples (approximately 25 mg of elastomer) are dissolved in carbon disulfide ($CS_2$) in approximately 1 ml. 100 µl of deuterated cyclohexane are added for the lock signal.

The spectra are acquired on a Bruker Avance 500 MHz spectrometer equipped with a 5 mm BBI Z-grad "broad band" probe.

The quantitative $^1H$ NMR experiment uses a simple 30° pulse sequence and a repetition time of 5 seconds between each acquisition. 256 accumulations are carried out at ambient temperature.

The $^1H$ NMR signals of the 8 quantified protons (protons bonded to the carbons identified 1 to 4 in FIG. 1) of the grafted DEAB correspond to a broad unresolved peak with the chemical shift of 3.2 ppm.

The edited $2D^1H/^{13}C\ ^1J$ HSQC NMR correlation spectrum makes it possible to confirm the nature of the grafted unit by virtue of the chemical shifts of the carbon and proton atoms. The signal of the carbons 1 to 4 has a chemical shift at 44.4 ppm.

The $^1H$ NMR spectrum makes it possible to quantify the grafted DEAB units by integration of the broad unresolved peaks of signals described above: H1, H2 for the dehydrated DEAB form and H3, H4 for the carbinol DEAB form.

The grafted diethylaminobenzophenone, dehydrated and carbinol forms, has the formula of FIG. 1.

The chemical shifts are calibrated with respect to the protonated impurity of carbon disulfide δ ppm $^1H$ at 7.18 ppm, referenced with regard to TMS (δ ppm $^1$H at 0 ppm), and δ ppm $^{13}$C at 192 ppm, referenced with regard to TMS (δ ppm $^{13}$C at 0 ppm).

The simple pulse 1D $^1$H NMR spectrum makes it possible to quantify the units of the polymer by integration of the broad unresolved peaks of characteristic signals. For example, for an SBR (styrene/butadiene rubber), the broad unresolved peaks considered for the calculation are styrene 5H (protons) between 7.4 ppm and 6.0 ppm, 1,4-PB (polybutadiene) 2H+1,2-PB 1H between 5.8 ppm and 4.9 ppm and 1,2-PB 2H between 4.9 ppm and 4.3 ppm.

Thus, knowing the total amount of chains by the $M_n$ value obtained by SEC analysis, it is possible to determine the content of living chains corresponding to the content of DEAB-functionalized chains.

Content of Hexamethyleneimine (HMN)-Initiated Chains

The content of hexamethyleneimine (HMN)-initiated chains is determined by NMR analysis.

The samples (approximately 200 mg) are dissolved in approximately 1 ml of carbon disulfide ($CS_2$). 100 μl of deuterated cyclohexane are added to the solution for the lock of the spectrometer.

The spectra are acquired on a Bruker Avance 500 MHz spectrometer equipped with a BBI Z-grad "broad band" 5 mm cryoprobe.

The quantitative $^1$H NMR experiment uses a simple 30° pulse sequence and a repetition time of 5 seconds between each acquisition. 64 to 1024 accumulations are carried out. Two-dimensional $^1$H/$^{13}$C experiments were carried out in order to determine the structure of the functional polymers. The proton chemical shifts are calibrated with respect to the protonated impurity of the $CS_2$ at 7.18 ppm.

In the case of a butadiene homopolymer, or a polybutadiene, the quantitative simple pulse 1D NMR measurement makes it possible to observe two broad unresolved peaks (2.8 ppm to 3.0 ppm and 2.3 ppm to 2.5 ppm) respectively corresponding to the protons 1 and 2.

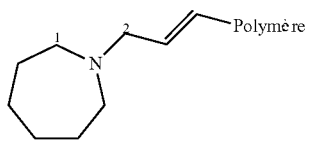

The integration of the protons 2 makes it possible to estimate the amount of HMN units grafted to a 1,4-butadiene and the integration of the protons 1 makes it possible to estimate the total amount of HMN units grafted to the polybutadiene chains.

In the case of a copolymer of butadiene and of styrene, the quantitative simple pulse 1D H NMR measurement makes it possible to observe a single broad unresolved peak (2.8 ppm to 3.0 ppm) corresponding to the protons 2. The integration of the protons 2 makes it possible to estimate the amount of HMN units grafted to a 1,4-butadiene only. The signal of the protons 1 is masked by the aliphatic signal of the SBR matrix. In the case of an SBR, only the amount of HMN units grafted to a 1,4-butadiene can thus be estimated.

Thus, knowing the total amount of chains by the $M_n$ value obtained by SEC analysis, it is possible to determine the content of HMN-initiated chains (only the HMN units bonded to a 1,4-butadiene unit are quantifiable in the case of copolymers of butadiene and of styrene).

Examples of Preparation of Elastomers

Methylcyclohexane, butadiene, styrene and tetrahydrofurfuryl ethyl ether are continuously introduced, according to the proportions described in each example, into a pilot-scale continuous polymerization plant containing one or more stirred continuous reactors, considered to be continuous stirred-tank reactors according to a person skilled in the art. n-Butyllithium is introduced in a sufficient amount in order to neutralize the protic impurities introduced by the different constituents present in the line input and then lithiated hexamethyleneimine is introduced in order to initiate the polymer chains. Lithiated hexamethyleneimine is synthesized in situ continuously by reaction of one equivalent of hexamethyleneimine and 1.02 equivalents of butyllithium in a reactor considered to be continuous stirred-tank reactor.

The residence times and the concentrations indicated in the examples are calculated from the flow rates of the different constituents entering the polymerization process.

Example a—Comparative—Continuous Process with 1 Reactor

A synthesis of butadiene/styrene polymer is carried out according to a comparative process using 1 single stirred reactor considered to be continuous stirred-tank reactor.

The operating conditions are specified in Table 1.

TABLE 1

| Operating conditions | Value | Unit | Reactor |
|---|---|---|---|
| Number of reactors | 1 | — | — |
| Volume of the reactors | 14 | l | 1 |
| % Styrene (1) | 33 | % | 1 |
| % Monomers by weight (2) | 12 | % | 1 |
| Polar agent (tetrahydrofurfuryl ethyl ether) | $3.51 \times 10^{-4}$ | mol/l | 1 |
| Active initiator (lithiated hexamethyleneimine) | $6.45 \times 10^{-4}$ | mol/l | 1 |
| Residence time | 30 | min | 1 |
| Temperature | 90 | ° C. | 1 |
| Conversion by weight (3) | 87 | % | 1 |

(1) by weight, with respect to the sum of all the inputs by weight of monomers of the process
(2) by weight, with respect to the sum of all the inputs by weight of the process
(3) conversion by weight of monomers in the reactor The characteristics of the polymer obtained at the outlet of the reactor are given in Table 2.

TABLE 2

| Vinyl content (4) | 25.5 | % |
|---|---|---|
| Styrene content (5) | 28 | % |
| Tg | −45 | ° C. |
| PI | 2.0 | — |
| $M_n$ | 123.2 | kg/mol |
| Amount of HMN functional groups | 6.1 | mmol/kg |
| Content of HMN-initiated chains (6) | 76 | % |
| Amount of DEAB functional groups | 4.2 | mmol/kg |
| Content of living polymer (7) | 51 | % |

(4) by weight, with respect to the butadiene units present in the polymer chains
(5) by weight, with respect to the butadiene and styrene units
(6) molar ratio of the amount of HMN functional groups, determined by NMR, to the number of chain ends, calculated from the $M_n$ value measured on the elastomer recovered on conclusion of the stage of functionalization with DEAB.
(7) molar ratio of the amount of DEAB functional groups, determined by NMR, to the number of chain ends, calculated from the $M_n$ value measured on the elastomer recovered on conclusion of the stage of functionalization with DEAB.

Example B—According to the Invention—Continuous Process with 2 Reactors in Series with 50% Conversion in the First Reactor A synthesis of styrene/butadiene polymer is carried out according to a process according to the invention using 2 stirred reactors, considered to be continuous stirred-tank reactors, in series.

The operating conditions are specified in Table 3.

TABLE 3

| Operating conditions | Value | Unit | Reactor |
|---|---|---|---|
| Number of reactors | 2 | — | — |
| Volume of the reactors | 14 | l | 1 |
|  | 14 |  | 2 |
| % Styrene (1) | 38 | % | 1 |
| % Monomers by weight (2) | 12 | % | 1 |
| Polar agent (tetrahydrofurfuryl ethyl ether) | $8.8 \times 10^{-5}$ | mol/l | — |
| Active initiator (lithiated hexamethyleneimine) | $5.43 \times 10^{-4}$ | mol/l | 1 |
| Residence time | 30 | min | 1 |
|  | 30 | min | 2 |
| Temperature | 55 | °C. | 1 |
|  | 75 |  | 2 |
| Conversion by weight (3) | 46 | % | 1 |
|  | 89 | % | 2 |

(1) by weight, with respect to the sum of all the inputs by weight of monomers of the process
(2) by weight, with respect to the sum of all the inputs by weight of the process
(3) conversion by weight of monomers at the outlet of the reactor The characteristics of the polymer obtained at the outlet of the reactor 2 are given in Table 4.

TABLE 4

| Vinyl content (4) | 25 | % |
|---|---|---|
| Styrene content (5) | 28 | % |
| Tg | −45 | °C. |
| $M_n$ | 149.7 | kg/mol |
| PI | 1.6 | — |
| Amount of HMN functional groups | 4.9 | mmol/kg |
| Content of HMN-initiated chains (6) | 74 | % |
| Amount of DEAB functional groups | 6.4 | mmol/kg |
| Content of living polymer (7) | 96 | % |

(4) by weight, with respect to the butadiene units present in the polymer chains
(5) by weight, with respect to the butadiene and styrene units
(6) molar ratio of the amount of HMN functional groups, determined by NMR, to the number of chain ends, calculated from the $M_n$ value measured on the elastomer recovered on conclusion of the stage of functionalization with DEAB.
(7) molar ratio of the amount of DEAB functional groups, determined by NMR, to the number of chain ends, calculated from the $M_n$ value measured on the elastomer recovered on conclusion of the stage of functionalization with DEAB.

Thus, this example shows that it is possible to concomitantly obtain, with the continuous process according to the invention, a high conversion and a high content of living polymer.

Example C—Comparative—Continuous Process with 2 Reactors in Series with a 75% Conversion in the First Reactor A synthesis of styrene/butadiene polymer is carried out according to a process according to the invention using 2 stirred reactors, considered to be continuous stirred-tank reactors, in series.

The operating conditions are specified in Table 5.

TABLE 5

| Operating conditions | Value | Unit | Reactor |
|---|---|---|---|
| Number of reactors | 2 | — | — |
| Volume of the reactors | 14 | l | 1 |
|  | 14 |  | 2 |
| % Styrene (1) | 30 | % | 1 |
| % Monomers by weight (2) | 12 | % | 1 |
| Polar agent (tetrahydrofurfuryl ethyl ether) | $1.9 \times 10^{-4}$ | mol/l | — |
| Active initiator (lithiated hexamethyleneimine) | $6.01 \times 10^{-4}$ | mol/l | 1 |
| Residence time | 30 | min | 1 |
|  | 30 | min | 2 |
| Temperature | 75 | °C. | 1 |
|  | 90 | °C. | 2 |
| Conversion by weight (3) | 75 | % | 1 |
|  | 96 | % | 2 |

(1) by weight, with respect to the sum of all the inputs by weight of monomers of the process
(2) by weight, with respect to the sum of all the inputs by weight of the process
(3) conversion by weight of monomers at the outlet of the reactor The characteristics of the polymer obtained at the outlet of the reactor 2 are given in Table 6.

TABLE 6

| Vinyl content (4) | 25.5 | % |
|---|---|---|
| Styrene content (5) | 28 | % |
| Tg | −45 | °C. |
| $M_n$ | 146.0 | kg/mol |
| PI | 1.8 | — |
| Amount of HMN functional groups | 5.2 | mmol/kg |
| Content of HMN-initiated chains (6) | 76 | % |
| Amount of DEAB functional groups | 4.0 | mmol/kg |
| Content of living polymer (7) | 59 | % |

(4) by weight, with respect to the butadiene units present in the polymer chains
(5) by weight, with respect to the butadiene and styrene units
(6) molar ratio of the amount of HMN functional groups, determined by NMR, to the number of chain ends, calculated from the $M_n$ value measured on the elastomer recovered on conclusion of the stage of functionalization with DEAB.
(7) molar ratio of the amount of DEAB functional groups, determined by NMR, to the number of chain ends, calculated from the $M_n$ value measured on the elastomer recovered on conclusion of the stage of functionalization with DEAB.

Thus, this comparative example shows that, if the conversion of monomers is too high in the reactor 1, then the content of living polymer is less than 90% at the outlet of reactor 2.

Example D—According to the Invention—Continuous Process with 2 Reactors in Series with 60% Conversion in the First Reactor A synthesis of styrene/butadiene polymer is carried out according to a process according to the invention using 2 stirred reactors, considered to be continuous stirred-tank reactors, in series.

The operating conditions are specified in Table 7.

TABLE 7

| Operating conditions | Value | Unit | Reactor |
|---|---|---|---|
| Number of reactors | 2 | — | — |
| Volume of the reactors | 14 | l | 1 |
|  | 14 |  | 2 |
| % Styrene (1) | 33 | % | 1 |

TABLE 7-continued

| Operating conditions | Value | Unit | Reactor |
|---|---|---|---|
| % Monomers by weight (2) | 12 | % | 1 |
| Polar agent (tetrahydrofurfuryl ethyl ether) | $1.2 \times 10^{-4}$ | mol/l | — |
| Active initiator (lithiated hexamethyleneimine) | $5.6 \times 10^{-4}$ | mol/l | 1 |
| Residence time | 30 | min | 1 |
|  | 30 | min | 2 |
| Temperature | 65 | °C. | 1 |
|  | 80 |  | 2 |
| Conversion by weight (3) | 62 | % | 1 |
|  | 94 | % | 2 |

(1) by weight, with respect to the sum of all the inputs by weight of monomers of the process
(2) by weight, with respect to the sum of all the inputs by weight of the process
(3) conversion by weight of monomers at the outlet of the reactor The characteristics of the polymer obtained at the outlet of the reactor 2 are given in Table 8.

TABLE 8

| Vinyl content (4) | 25 | % |
|---|---|---|
| Styrene content (5) | 28 | % |
| Tg | −46 | °C. |
| $M_n$ | 153.4 | kg/mol |
| PI | 1.7 | — |
| Amount of HMN functional groups | 5.0 | mmol/kg |
| Content of HMN-initiated chains (6) | 76 | % |
| Amount of DEAB functional groups | 5.9 | mmol/kg |
| Content of living polymer (7) | 91 | % |

(4) by weight, with respect to the butadiene units present in the polymer chains
(5) by weight, with respect to the butadiene and styrene units
(6) molar ratio of the amount of HMN functional groups, determined by NMR, to the number of chain ends, calculated from the $M_n$ value measured on the elastomer recovered on conclusion of the stage of functionalization with DEAB.
(7) molar ratio of the amount of DEAB functional groups, determined by NMR, to the number of chain ends, calculated from the $M_n$ value measured on the elastomer recovered on conclusion of the stage of functionalization with DEAB.

Thus, this example shows that it is possible to concomitantly obtain, with the continuous process according to the invention, a high conversion and a high content of living polymer.

Example E—According to the Invention—Continuous Process with 3 Reactors in Series A synthesis of butadiene/styrene polymer is carried out according to a process according to the invention using 3 stirred reactors, considered to be continuous stirred-tank reactors, in series.

The operating conditions are specified in Table 9.

TABLE 9

| Operating conditions | Value | Unit | Reactor |
|---|---|---|---|
| Number of reactors | 3 | — | — |
| Volume of the reactors | 14 | l | 1 |
|  | 14 |  | 2 |
|  | 14 |  | 3 |
| % Styrene (1) | 28 | % | 1 |
| % Monomers by weight (2) | 12 | % | 1 |
| Polar agent (tetrahydrofurfuryl ethyl ether) | $8.8 \times 10^{-5}$ | mol/l |  |
| Active initiator (lithiated hexamethyleneimine) | $5.81 \times 10^{-4}$ | mol/l | 1 |
| Residence time | 30 | min | 1 |
|  | 30 | min | 2 |
|  | 30 | min | 3 |
| Temperature | 50 | °C. | 1 |
|  | 70 | °C. | 2 |
|  | 80 | °C. | 3 |
| Conversion by weight (3) | 40 | % | 1 |
|  | 70 | % | 2 |
|  | 93 | % | 3 |

(1) by weight, with respect to the sum of all the inputs by weight of monomers of the process
(2) by weight, with respect to the sum of all the inputs by weight of the process
(3) conversion by weight of monomers at the outlet of the reactor The characteristics of the polymer obtained at the outlet of the reactor 3 are given in Table 10.

TABLE 10

| Vinyl content (4) | 25.5 | % |
|---|---|---|
| Styrene content (5) | 27.5 | % |
| Tg | −46 | °C. |
| PI | 1.45 | — |
| $M_n$ | 146.2 | kg/mol |
| Amount of HMN functional groups | 5.3 | mmol/kg |
| Content of HMN-initiated chains (6) | 77 | % |

(4) by weight, with respect to the butadiene units present in the polymer chains
(5) by weight, with respect to the butadiene and styrene units
(6) molar ratio of the amount of HMN functional groups, determined by NMR, to the number of chain ends, calculated from the $M_n$ value measured on the elastomer recovered on conclusion of the stage of functionalization with DEAB.
(7) molar ratio of the amount of DEAB functional groups, determined by NMR, to the number of chain ends, calculated from the $M_n$ value measured on the elastomer recovered on conclusion of the stage of functionalization with DEAB.

Thus, this example shows that it is possible to concomitantly obtain, with the continuous process according to the invention, a high conversion and a high content of living polymer.

The invention claimed is:

1. A process for the continuous synthesis of a diene elastomer by means of n reactors r1 to rn, considered to be continuous stirred-tank reactors, which are equipped with an internal stirring system, and which are arranged in series, n varying from 2 to 15, the reactor r1 being fed by an input solution comprising a solvent, one or more monomer(s), an anionic polymerization initiator chosen from lithium amides and a polar agent, one or more of the reactors r2 to rn additionally being optionally fed by reinjection of a solution comprising solvent and/or monomers and/or polar agent, a conversion by weight $C_1$ in the first reactor being less than 70%, where $C_1 = P_1/W_1$ where $P_1$ is the weight of polymer formed at an outlet of the reactor r1, where $W_1$ is the amount by weight of monomer(s) introduced into the reactor r1, the total conversion by weight $C_n$ at an outlet of the reactor rn being greater than or equal to 70%, where:

$$C_n = \frac{P_n}{\sum_1^n W_i}$$

where $P_n$ is the weight of polymer formed at the outlet of the reactor rn, and $W_i$ is the amount by weight of monomer(s) introduced into the reactor ri, i varying from 1 to n.

2. A process according to claim 1, wherein n varies from 2 to 3.

3. A process according to claim 1, wherein the conversion by weight $C_1$ in the reactor r1 is less than 65%, preferably less than 60%.

4. A process according to claim 1, wherein the total conversion by weight $C_n$ at the outlet of the reactor rn is greater than or equal to 80%.

5. A process according to claim 1, wherein the diene elastomer is a copolymer of butadiene and of vinylaromatic monomer.

6. A process according to claim 1, wherein the residence time in the reactor r1, i varying from 1 to n, is between 1 and 60 minutes.

7. A process according to claim 1, wherein the output stream from the reactor rn containing the living chains is brought into contact with one or more agents for stopping polymerization continuously injected into the process.

8. A process according to claim 7, wherein the living diene elastomer included in the output stream from the reactor n, before reaction with the stopping agent, is reacted with one or more functionalization, coupling or star-branching agents.

9. A process according to claim 1, wherein the living diene elastomer included in the output stream from the reactor n is reacted with one or more functionalization, coupling or star-branching agents.

10. A process according to claim 1, wherein n varies from 2 to 9.

11. A process according to claim 2, wherein n is 2.

12. A process according to claim 3, wherein the conversion by weight $C_1$ in the reactor r1 is less than 60%.

13. A process according to claim 4, wherein the total conversion by weight $C_n$ at the outlet of the reactor rn is greater than or equal to 85%.

14. A process according to claim 5, wherein the diene elastomer is an SBR.

15. A process according to claim 6, wherein the residence time in the reactor ri is between 5 and 60 minutes.

16. A process according to claim 15, wherein the residence time in the reactor ri is between 10 and 50 minutes.

17. A process according to claim 1, wherein the solution is purified.

* * * * *